US006669832B1

(12) United States Patent
Saito et al.

(10) Patent No.: US 6,669,832 B1
(45) Date of Patent: Dec. 30, 2003

(54) ELECTRONIC TRANSACTION SYSTEM

(75) Inventors: Katsuro Saito, Kawasaki (JP); Teruo Mizutani, Kawasaki (JP); Makoto Yonekura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/037,866

(22) Filed: Mar. 10, 1998

(30) Foreign Application Priority Data

Oct. 2, 1997 (JP) ........................................ 9-269499

(51) Int. Cl.[7] ........................................ G06F 17/60

(52) U.S. Cl. ........................ 205/26; 705/16; 705/17; 705/18; 705/19; 705/20; 705/21; 705/22; 705/23; 705/24; 705/25; 705/27; 705/28; 705/29; 705/30; 705/31; 705/33; 705/35; 705/36

(58) Field of Search ........................ 705/26, 27, 28, 705/16, 17, 18, 19, 20, 21, 22, 23, 24, 25, 29, 30, 31, 33, 35

(56) References Cited

U.S. PATENT DOCUMENTS

| | | | | | |
|---|---|---|---|---|---|
| 4,992,940 | A | * | 2/1991 | Dworkin | 364/401 |
| 5,570,291 | A | * | 10/1996 | Dudle et al. | 364/468.01 |
| 5,666,493 | A | * | 9/1997 | Wojcik et al. | 705/26 |
| 5,694,551 | A | * | 12/1997 | Doyle et al. | 395/226 |
| 5,710,887 | A | * | 1/1998 | Chelliah et al. | 395/226 |
| 5,758,327 | A | * | 5/1998 | Gardner et al. | 395/226 |
| 5,895,454 | A | * | 4/1999 | Harrington | 705/26 |
| 5,899,980 | A | * | 5/1999 | Wilf et al. | 705/26 |
| 5,909,492 | A | * | 6/1999 | Payne et al. | 380/24 |
| 5,960,411 | A | * | 9/1999 | Hartman et al. | 705/26 |
| 5,970,475 | A | * | 10/1999 | Barnes et al. | 705/27 |
| 6,115,690 | A | * | 9/2000 | Wong | 705/7 |

FOREIGN PATENT DOCUMENTS

| | | | | |
|---|---|---|---|---|
| JP | 7-21280 | | 1/1995 | |
| JP | 7-93414 | | 4/1995 | |
| JP | 9-62737 | | 3/1997 | |
| JP | 9-91348 | | 4/1997 | |
| JP | 9-171531 | | 6/1997 | |
| WO | WO-9324892 | * | 12/1993 | G06F/15/22 |
| WO | WO-9717663 | * | 5/1997 | G06F/17/60 |
| WO | WO 9717663 | * | 5/1997 | 705/26 |

OTHER PUBLICATIONS

John Price, College Accounting, 7$^{th}$ Edition, 1994, Glenco/Macmillan/McGraw–Hill, 230–232.*

Jiro Yoshiro, Kinokuniya Bookstore Ltd., "Buying Books Through the Internet/Prompt Processing via WWW", No. 244 Nikkei Communications, published by Nikkei BP Ltd., pp. 143–148 (Apr. 21, 1997).

(List continued on next page.)

*Primary Examiner*—Hyung-Suo Sough
*Assistant Examiner*—Richard Fults
(74) *Attorney, Agent, or Firm*—Staas & Halsey LLP

(57) ABSTRACT

A request for a commodity that each office in an organization needs is sent from a terminal in the office to a general affairs service center in the organization. The request is then sent to a VAN center where it is entered into databases and appears in a home page of a WWW server. In the case of a request to order a commodity, a decision is made as to whether or not an estimate has been made for the commodity. If it has not been made, the order request is sent to the WWW server after a reply to the estimate request has been received from the vendor. The vendor acquires the request information that appears in a home page of the WWW server connected with a network and then makes an estimate for the commodity and delivers it.

23 Claims, 16 Drawing Sheets

OTHER PUBLICATIONS

Computer Age Co., Ltd., "This is the Way The Intranet Systems Should Be Used," No. 358 of Computopia, vol. 32 (Jul. 1, 1996).

Hiroyuki Sugiyama, Intranet, The Ever Growing System/Server Based Corporate Information System, No. 385 of Nikkei Computer, pp. 126–133 (Feb. 19, 1996).

Patent Abstracts of Japan for Publication No. 09171531, dated Jun. 30, 1997.

Patent Abstracts of Japan for Publication No. 07021280, dated Jan. 24, 1995.

Patent Abstracts of Japan for Publication No. 09062737, dated Jul. 7, 1997.

Patent Abstracts of Japan for Publication No. 09001348, dated Apr. 4, 1997.

* cited by examiner

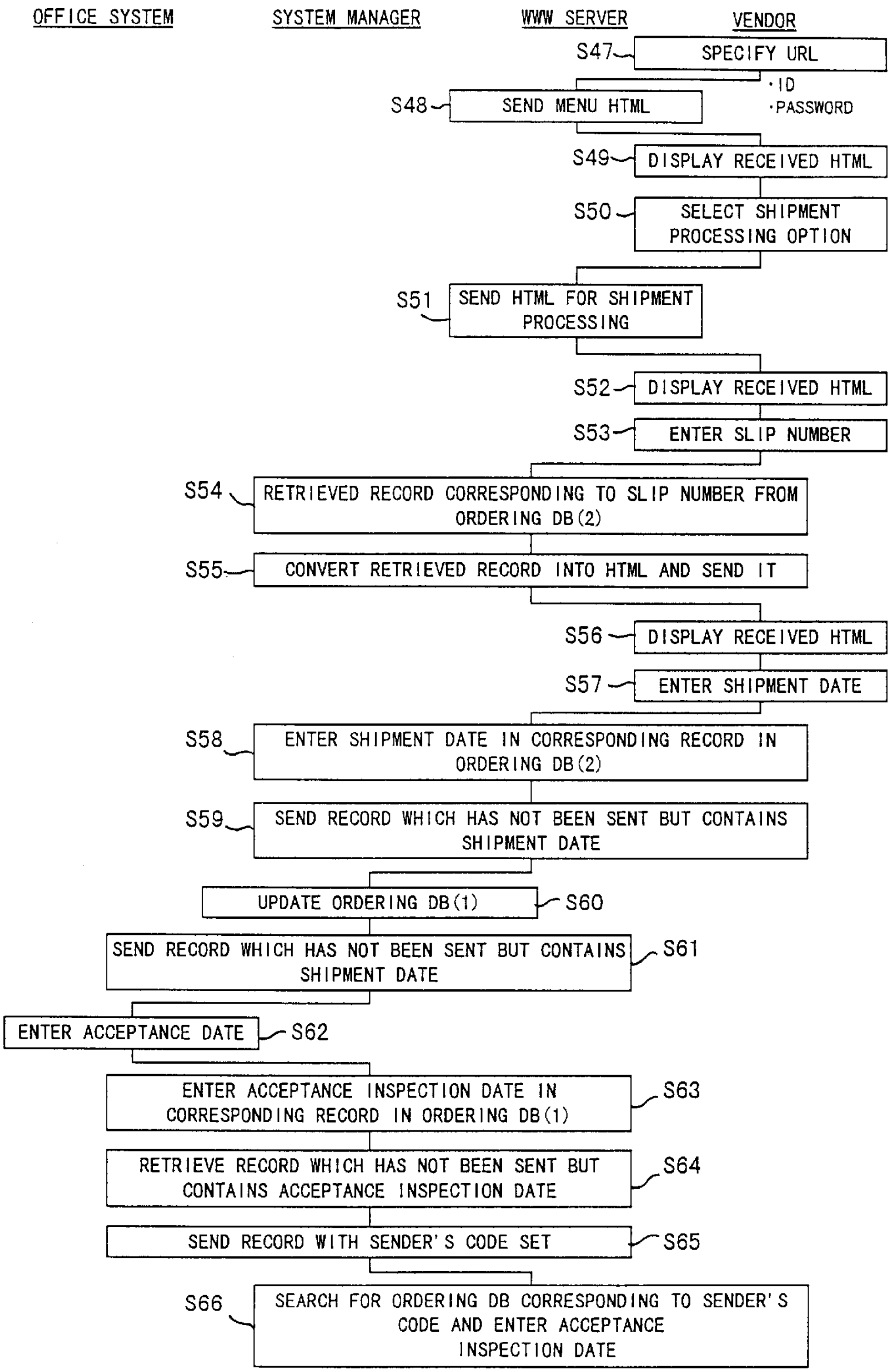
F I G. 4

CLASSIFICATION DB

| MENU | MENU NAME | ITEMS |
|---|---|---|
| 01 | BOOKS | A1 ~ A9 |
| 02 | STATIONERY | B1 ~ B9 |
| 03 | PRINTING | C1 ~ C9 |

FIG. 6A

ESTIMATE DB (1)

| ESTIMATE NO. | ITEM | ITEM NAME | SPEC. | DESIRED DELIVERY DATE | DESIRED REPLY DATE | MENU | MENU NAME |
|---|---|---|---|---|---|---|---|
| 0101 | B1 | PENCIL | HB | 09/30/97 | 09/20/97 | 02 | STATIONERY |

FIG. 6B

ESTIMATE DB (2)

| ESTIMATE NO. | ITEM | ITEM NAME | SPEC. | DESIRED DELIVERY DATE | DESIRED REPLY DATE | MENU | MENU NAME | TRANSMISSION DATE |
|---|---|---|---|---|---|---|---|---|
| 0101 | A1 | JAPANESE BOOK | INTRODUCTION TO HTML | 10/10/97 | 09/20/97 | 01 | BOOKS | |
| 0102 | A1 | JAPANESE BOOK | BASIC BOOKKEEPING | 10/10/97 | 09/10/97 | 01 | BOOKS | |
| 0103 | B1 | PENCIL | HB | 09/30/97 | 09/20/97 | 02 | STATIONERY | |
| 0104 | B1 | PENCIL | TWO-COLOR PENTOL CO. | 10/10/97 | 09/10/97 | 02 | STATIONERY | |

FIG. 6C

NUMBER-OF-REQUEST DB (2)

| MENU | MENU NAME | NUMBER |
|---|---|---|
| 01 | BOOKS | 1 |
| 02 | STATIONERY | 1 |
| 03 | PRINTING | 1 |
| 04 | PHOTOGRAPHING | 1 |

ORDERING DB (1)

| SLIP NO. | ITEM | ITEM NAME | SPEC. | QUANTITY | UNIT | DESIRED DELIVERY DATE | VENDOR | VENDOR NAME | SHIPMENT DATE | ACCEPTANCE INSPECTION DATE | TRANSMISSION DATE |
|---|---|---|---|---|---|---|---|---|---|---|---|
| 0204 | B2 | PEN | FLUORESCENT PEN RED | 1 | DOZEN | 10/10/97 | 201 | A | | | |

FIG. 6F

ORDERING DB (2)

| SLIP NO. | ITEM | ITEM NAME | SPEC. | QUANTITY | UNIT | DESIRED DELIVERY DATE | VENDOR | VENDOR NAME | SHIPMENT DATE | ACCEPTANCE INSPECTION DATE | PRINTING DATE | TRANSMISSION DATE |
|---|---|---|---|---|---|---|---|---|---|---|---|---|
| 0201 | A1 | JAPANESE BOOK | INTRODUCTION TO HTML | 1 | COPIES | 10/10/97 | 203 | C | | | | |
| 0202 | A1 | JAPANESE BOOK | BASIC BOOKKEEPING | 1 | COPIES | 10/10/97 | 203 | C | | | | |
| 0212 | B1 | PENCIL | RED YOTSUBISHI CO. | 1 | DOZEN | 08/10/97 | 201 | A | | | | |
| 0213 | B1 | PENCIL | HB | 1 | DOZEN | 09/30/97 | 201 | A | | | | |
| 0214 | B2 | PEN | FLUORESCENT PEN RED | 1 | DOZEN | 10/10/97 | 201 | A | | | | |

MAIN MENU

1. ESTIMATE REQUEST

| ITEM NAME | NUMBER OF REQUESTS | ITEM NAME | NUMBER OF REQUESTS |
|---|---|---|---|
| BOOK | 422 | SUNDRIES | 307 |
| PHOTOGRAPHING | 0 | STATIONERY | 1,500 |
| DEVELOPMENT | 0 | DATE STAMP | |
| OUTSIDE REPAIR | 0 | PRINTING | 1,137 |
| TRANSLATION/TYPING | 148 | SIGNBOARD/PANEL | |
| FIXTURES | 410 | OTHERS | 780 |

2. ORDER ACCEPTANCE PROCESSING
3. SHIPMENT INFORMATION TRANSMISSION
4. ACCOUNTS PAYABLE INFORMATION RECEPTION
5. LIST OF ESTIMATE REPLIES

FIG. 7

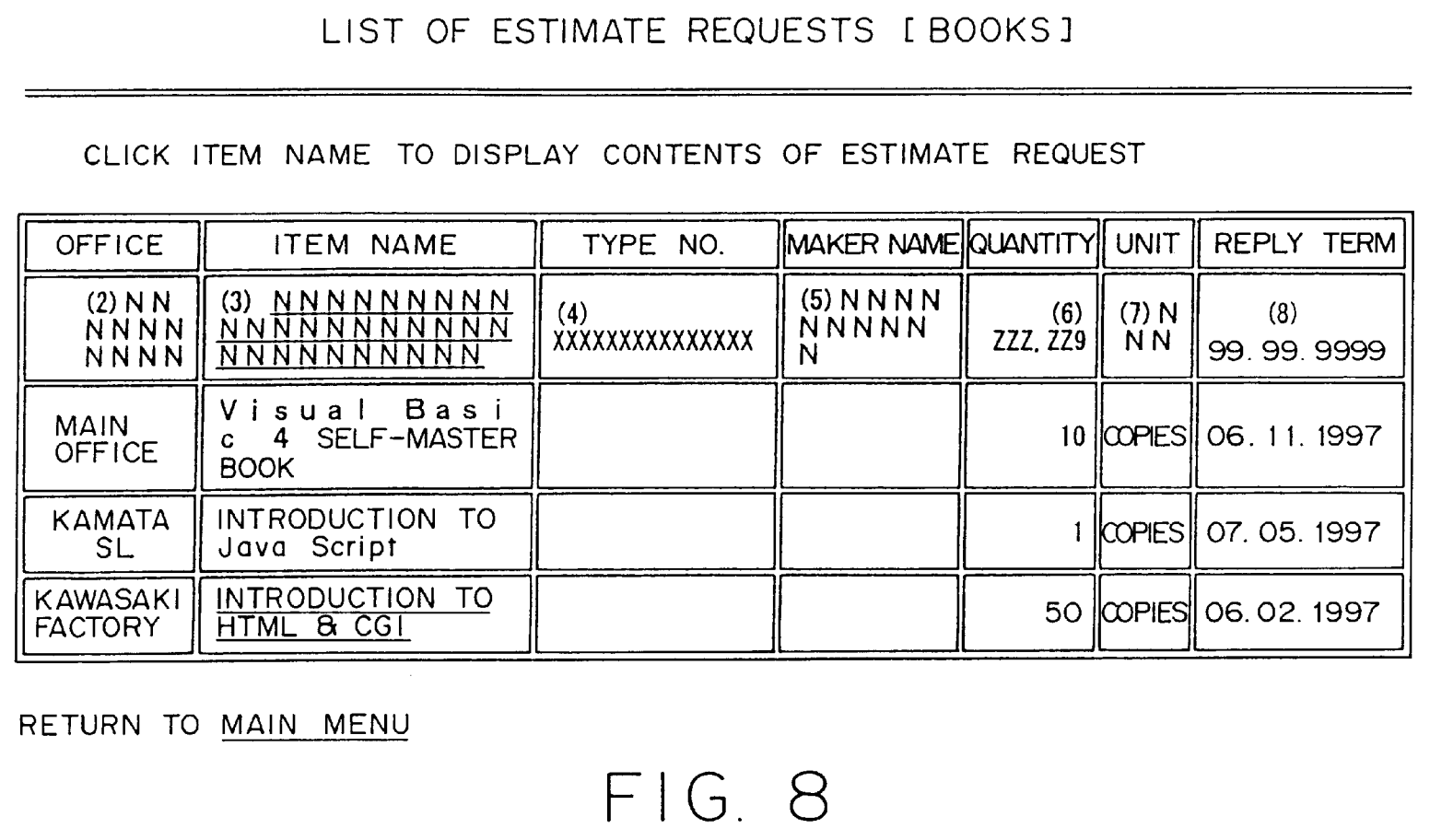

LIST OF ESTIMATE REQUESTS [ BOOKS ]

CLICK ITEM NAME TO DISPLAY CONTENTS OF ESTIMATE REQUEST

| OFFICE | ITEM NAME | TYPE NO. | MAKER NAME | QUANTITY | UNIT | REPLY TERM |
|---|---|---|---|---|---|---|
| (2) NN NNNN NNNN | (3) NNNNNNNNN NNNNNNNNNNN NNNNNNNNNN | (4) XXXXXXXXXXXXXXX | (5) NNNN NNNNN N | (6) ZZZ, ZZ9 | (7) N NN | (8) 99. 99. 9999 |
| MAIN OFFICE | Visual Basic 4 SELF-MASTER BOOK | | | 10 | COPIES | 06. 11. 1997 |
| KAMATA SL | INTRODUCTION TO Java Script | | | 1 | COPIES | 07. 05. 1997 |
| KAWASAKI FACTORY | INTRODUCTION TO HTML & CGI | | | 50 | COPIES | 06. 02. 1997 |

RETURN TO MAIN MENU

FIG. 8

ESTIMATE REQUEST CONTENTS

ESTIMATE REPLY DATA : (1) 99. 99. 9999

[ REQUEST INFORMATION]

| | | |
|---|---|---|
| ESTIMATE REQUEST NO. | (2) | XXXXXXXXXXX |
| REQUESTER NAME | (4) | NNNNNNNNNN |
| REQUESTER DATE | (5) | 99. 99. 9999 |
| EXTENSION NUMBER | (6) | XXXX-XXXX |
| PHONE NUMBER | (7) | XXXXXXXXXX |
| KIND OF WORK CODE OF REQUESTING SOURCE | (8) | XXXX-XXXX |
| KIND OF WORK NAME OF REQUESTING SOURCE | (9) | NNNNNNNNNN |
| ITEM CODE | (10) | XXXXXX |
| ITEM NAME | (11) | NNNNNNNNNNNNNNNNNNNNNNNNNNNNNN |
| TYPE NO. | (12) | XXXXXXXXXXXX |
| MAKER NAME | (13) | NNNNNNNNNNN |
| QUANTITY | (14) | ZZ. ZZ9 |
| UNIT | (15) | NNN |
| DESIRED DELIVERY TERM | (16) | 99. 99. 9999 |
| PLACE OF DELIVERY | (17) | NNNNNNNNNNNNNNNNNNNNNNNNNNNNNN |
| | (18) | XXXXXXXXX |
| | (19) | NNNNNNNNNNNNNNNNNNNNNNNNNNNNNN |
| | (20) | XXXXXXXXXXXXXX (21) NNNNNNNNNN (22) NNNNNNNNNN |
| ACCOMPANYING ITEM | (23) | N |
| DETAILED SPECIFICATION | (24) | NNNNNNNNNNNNNNNNNNNNNNNNNNNNNNNN NNNNNNNNNNNNNNNNNNNNNNNNNNNN |
| REQUEST REASON | (25) | NNNNNNNNNNNNNNNNNNNNNNNNNNNNNNNN NNNNNNNNNNNNNNNNNNNNNNNNNNNN |
| SUPPLEMENTARY INFORMATION | (26) | NNNNNNNNNNNNNNNNNNNNNNNNNNNNNNNN NNNNNNNNNNNNNNNNNNNNNNNNNNNN |

[DETAILED INFORMATION]

| | |
|---|---|
| BOOK TO BE PURCHASED | NNNNNNNNNNNNNNNNNNNNNNNNNNNNNNNNNN NNNNNNNNNNNNNNNNNNNNNNNNNNNN |
| AUTHOR | NNNNNNNNNNNNNNNNNNNNNNNNNNNNNN |
| ISBN | XXXXXXXXXXXXXXXXXXXXXXXXXXXXXXXXXXXXXXXXXXXXXXXXXXXXXXXXXXXXXXXX |
| PUBLISHER | NNNNNNNNNNNNNNNNNNNNNNNNNNNNNN |
| PHONE NUMBER | XXXXXXXXXXXX |
| FAX NUMBER | XXXXXXXXXXXXX |

GO TO ESTIMATE REPLY

RETURN TO LIST OF ESTIMATES (BOOKS)

RETURN TO MAIN MENU

FIG. 9

ESTIMATE REPLY

| FILL IN FOLLOWING ITEMS | | |
|---|---|---|
| ESTIMATE REPLY NUMBER | (1) | XXXXXXXXXXXXXXXX |
| ESTIMATE REPLY TERM | (3) | |
| ITEM NAME | (4) | N N N N N N N N N N N N N N N N N N |
| TYPE NO. | (5) | XXXXXXXXXXXXXXXX |
| MAKER NAME | (6) | N N N N N N N N N N N N N N N N N N |
| QUANTITY | (7) | |
| UNIT | (8) | N N N |
| UNIT PRICE | (9) | YEN |
| LIST PRICE | (10) | YEN |
| DISCOUNT RATE | (11) | % |
| AMOUNT | (12) | YEN |
| DAYS FOR DELIVERY | (13) | DAYS |
| NAME OF PERSONNEL IN CHARGE | (14) | |
| WHERE TO MAKE CONTACT (TEL) | (15) | |
| PARTICULARS ATTACHED ? | (16) | YES NO |

F I G. 1 0

| (17) PARTICULARS | | | |
|---|---|---|---|
| (18) QUANTITY | (19) UNIT PRICE | (20) AMOUNT | |
| | | | |
| | | ZZ, ZZZ, ZZZ, ZZ9 | |
| | | | |
| | | ZZ, ZZZ, ZZZ, ZZ9 | |
| | | | |
| | | ZZ, ZZZ, ZZZ, ZZ9 | |
| | | | |
| | | ZZ, ZZZ, ZZZ, ZZ9 | |
| | | | |
| | | ZZ, ZZZ, ZZZ, ZZ9 | |
| | | | |
| | | ZZ, ZZZ, ZZZ, ZZ9 | |
| | | | |
| | | ZZ, ZZZ, ZZZ, ZZ9 | |
| | | | |
| | | ZZ, ZZZ, ZZZ, ZZ9 | |
| | | | |
| | | ZZ, ZZZ, ZZZ, ZZ9 | |
| | | | |
| | | ZZ, ZZZ, ZZZ, ZZ9 | |
| (21) DISCOUNT AMOUNT | | | |
| (22) TOTAL AMOUNT | | ZZ, ZZZ, ZZZ, ZZ9 | |

(23) (24)

RETURN TO PREVIOUS PAGE
RETURN TO LIST OF ESTIMATE REPLIES
RETURN TO MAIN MENU

FIG. 11

LIST OF ORDER ACCEPTANCE

ENTERPRISE CODE : XXXXXXX

VENDOR NAME : N N N N N N N N N N N N N N N N N N N N N N N N N

CLICK ITEM NAME TO DISPLAY STATEMENT OF DELIVERY

| SLIP NO. | ITEM NAME | QUANTITY | UNIT | DESIRED DELIVERY TERM | CONDITION | ACCEPTANCE INSPECTION DATE |
|---|---|---|---|---|---|---|
| (2) XXXXXXXXXXXXXX | (3) N N N N N N N N N N N N N N N N N N N N N N N N N N N N N N | (6) ZZZ, ZZ9 | (7) N N N | 99. 99. 9999 | (9) N N N | 99.99.9999 |
| 021010000001 | GRANPOWER 5 000 SERIES SA/ SE HANDBOOK | 10 | COPIES | 06. 11. 1997 | NOT OUTPUTTED | |
| 021010000003 | INTRODUCTION TO JAVA SCRIPT | 1 | COPIES | 07. 05. 1997 | OUTPUTTED | |
| 021010000005 | INTRODUCTION TO HTML & CGI | 50 | COPIES | 06. 02. 1997 | ACCEPTANCE INSPECTION | 07. 05. 1997 |

FIG. 12

STATEMENT OF DELIVERY

| | | |
|---|---|---|
| ORDERER FUJITSU LIMITED KAWASAKI FACTORY GENERAL AFFAIRS DEPARTMENT | | |
| SLIP NO. XXXXXXXXXXX | DATE OF ORDER 99. 99. 9999 | DATE OF DELIVERY 99. 99. 9999 |
| VENDER XXXXX NNNNNNNNNNNNNNNNNNNNNNNNNNN | | |
| PERSON IN CHARGE OF ORDER NNNNN | PHONE NUMBER XXXXXXXXXXXX | |
| REQUESTER NNNNNNNNNN | SOURCE OF PAYMENT N NNNNNNNNN | CLASSIFICATION FOR PAYMENT NNN |
| PERSON IN CHARGE OF REQUEST NNNNN | EXTENSION NUMBER XXXXXXXX | PHONE NUMBER XXXXXXXXXXX |
| ITEM CODE XXXXX | XXXXXXXXX | ITEM CODE NNNNNNNNNNNN NNNN |
| ITEM NAME NNNNNNNNNNNNNNNNNNNNNNNNNNNNN | | |
| TYPE NO. XXXXXXXXXXXXX | MAKER NAME NNNNNNNNNN | |
| TAX TYPE NNN | TAX PROCESSING TYPE NNN | ESTIMATION TYPE NNN |
| QUANTITY ZZZ, ZZZ, ZZ9 | UNIT NNN | UNIT PRICE ZZZ, ZZZ, ZZ9. 99 |
| AMOUNT ZZ, ZZZ, ZZZ, ZZ9 | ORDER XXXXXXXXXXXXXXXXXXXXXXXXXXXXXXXXXXXXXXX | |
| PLACE TO DELIVERY XXXXXXXXX NNNNNNNNNNNNNNNNNNNNNNNNNNNNNN | | |
| COMPANY NAME NNNNNNNNNNNNNNNNNNNNNNNNNNNNNN | | |
| PHONE NUMBER XXXXXXXXXXX | SECTION N NNNNNNNNN | NAME NNNNNNNNNN |
| DETAILED SPECIFICATION NNNNNNNNNNNNNNNNNNNNNNNNNNNNNNNNN NNNNNNNNNNNNNNNNNNNN | | |
| REQUEST REASON NNNNNNNNNNNNNNNNNNNNNNNNNNNNNNNNN NNNNNNNNNNNNNNNNNNNN | | |
| QUANTITY ACCEPTED ZZZ, ZZZ, ZZ9 | QUANTITY O.K.d. ZZZ, ZZZ, ZZ9 | DATE ACCEPTED 99. 99. 9999 |

SUPPLIER NNNNNNNNNNNNNNNNNNNNNNNNN

| ACCEPTANCE STAMP |
|---|
| |

[DETAILED INFORMATION]

DELIVERED BOOK NAME NNNNNNNNNNNNNNNNNNNNNNNNNNNNNNNNNN NNNNNNNNNNNNNNNNNNNNNNNNNNNN
AUTHOR NNNNNNNNNNNNNNNNNNNNNNNNNNNNNN
ISBN XXXXXXXXXXXXXXXXXXXXXXXXXXXXXXXXXXXXXXXXXXXXXXXXXXXXXXXXXXXXXXXX
PUBLISHER NNNNNNNNNNNNNNNNNNNNNNNNNNNNNN
PHONE NUMBER XXXXXXXXXXX
FAX NUMBER XXXXXXXXXXX

FIG. 13

SHIPMENT INFORMATION TRANSMISSION

| PLEASE FILE IN FOLLOWING ITEMS |
|---|
| SLIP NO. (1) |
| ITEM NAME (2) NNNNNNNNNNNNNNNNNNNNNNNNNNNNNNN NNN |
| QUANTITY (3) ZZZ, ZZZ, ZZ9 |
| DELIVERY TERM (5) 99/99/97 |
| SHIPMENT DATE (6) / / |

RETURN TO MAIN MENU

FOR THE MONTH OF N/NNNN DATE OF PAYMENT : 99. 99. 9999

| SLIP NO. | | ITEM NAME | | DATE ACCEPTED | DATE INSPECTED |
|---|---|---|---|---|---|
| QUANTITY | UNIT | UNIT PRICE | AMOUNT | CONSUMPTION TAX | AMOUNT PAID |
| XXXXXXXXXXXX | | N N N N N N N N N N N N N N N N N N N N N N N N N N N N N N | | 99. 99. 9999 | 99. 99. 9999 |
| ZZZ, ZZZ, ZZ9 | N N N | ZZZ, ZZZ, ZZ9. 99 | ZZ, ZZZ, ZZZ, ZZ9 | Z, ZZZ, ZZZ, ZZ9 | ZZ, ZZZ, ZZZ, ZZ9 |
| XXXXXXXXXXXX | | N N N N N N N N N N N N N N N N N N N N N N N N N N N N N N | | 99. 99. 9999 | 99. 99. 9999 |
| ZZZ, ZZZ, ZZ9 | N N N | ZZZ, ZZZ, ZZ9. 99 | ZZ, ZZZ, ZZZ, ZZ9 | Z, ZZZ, ZZZ, ZZ9 | ZZ, ZZZ, ZZZ, ZZ9 |
| XXXXXXXXXXXX | | N N N N N N N N N N N N N N N N N N N N N N N N N N N N N N | | 99. 99. 9999 | 99. 99. 9999 |
| ZZZ, ZZZ, ZZ9 | N N N | ZZZ, ZZZ, ZZ9. 99 | ZZ, ZZZ, ZZZ, ZZ9 | Z, ZZZ, ZZZ, ZZ9 | ZZ, ZZZ, ZZZ, ZZ9 |
| | | | | | |
| TOTAL AMOUNT | | | ZZ, ZZZ, ZZZ, ZZ9 | Z, ZZZ, ZZZ, ZZ9 | ZZ, ZZZ, ZZZ, ZZ9 |

FIG. 15

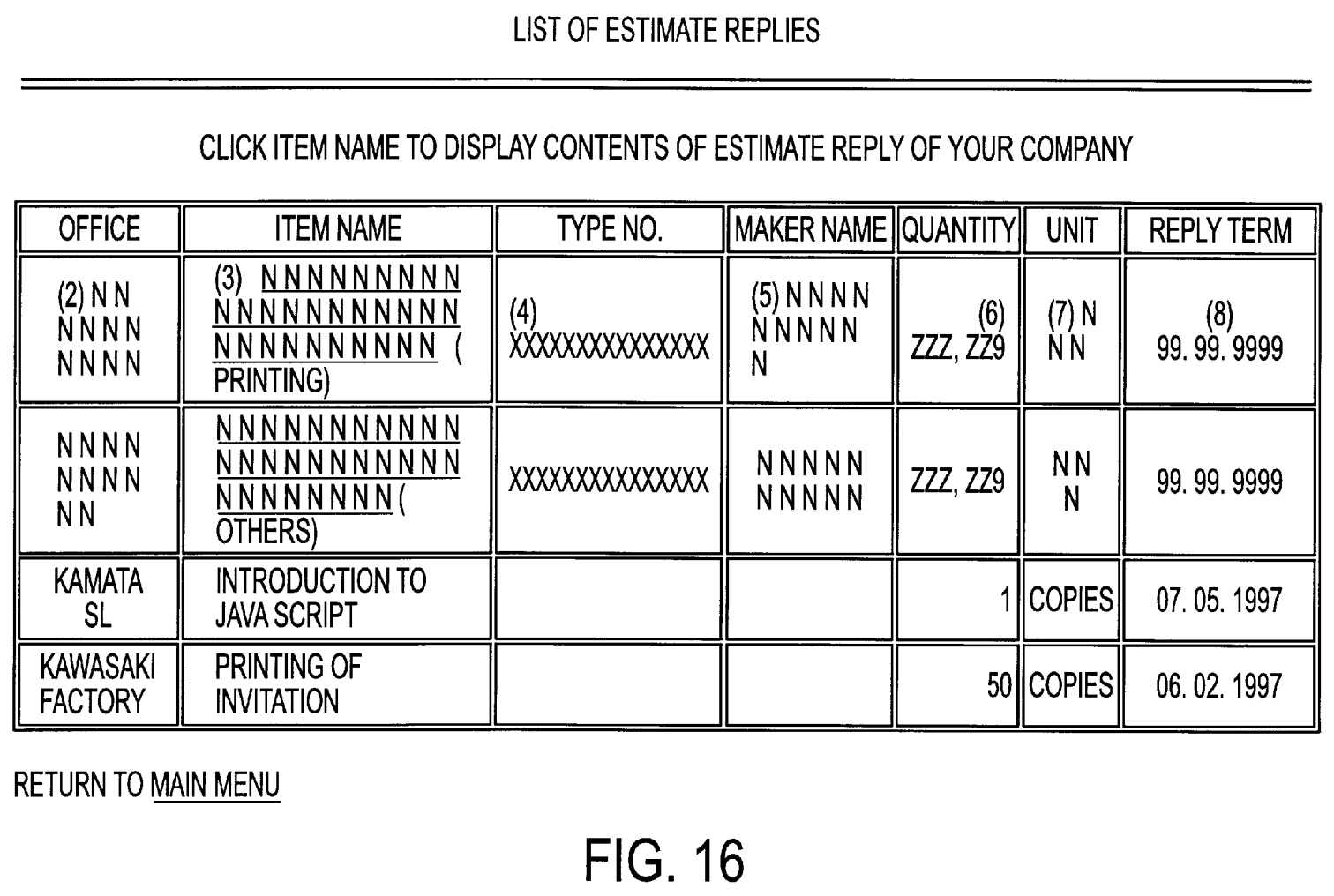

LIST OF ESTIMATE REPLIES

CLICK ITEM NAME TO DISPLAY CONTENTS OF ESTIMATE REPLY OF YOUR COMPANY

| OFFICE | ITEM NAME | TYPE NO. | MAKER NAME | QUANTITY | UNIT | REPLY TERM |
|---|---|---|---|---|---|---|
| (2) N N N N N N N N N N | (3) NNNNNNNNN NNNNNNNNNNN NNNNNNNNNN (PRINTING) | (4) XXXXXXXXXXXXXXX | (5) N N N N N N N N N N | (6) ZZZ, ZZ9 | (7) N N N | (8) 99. 99. 9999 |
| N N N N N N N N N N | NNNNNNNNNNN NNNNNNNNNNN NNNNNNNN (OTHERS) | XXXXXXXXXXXXXXX | N N N N N N N N N N | ZZZ, ZZ9 | N N N | 99. 99. 9999 |
| KAMATA SL | INTRODUCTION TO JAVA SCRIPT | | | 1 | COPIES | 07. 05. 1997 |
| KAWASAKI FACTORY | PRINTING OF INVITATION | | | 50 | COPIES | 06. 02. 1997 |

RETURN TO MAIN MENU

FIG. 16

ELECTRONIC TRANSACTION SYSTEM

BACKGROUND OF THE INVENTION

1. Field of the Invention

The present invention relates to an electronic transaction system which electronically makes requests to suppliers or vendors for estimates and orders for commodities.

2. Description of the Related Art

Conventionally, in an organization, requests for estimates and orders for commodities by an enterprise department office to suppliers or vendors with whom the organization does business are first approved by a superior officer in the office and then sent to the general affairs office in the organization. The general affairs office sorts out the requests and sends the requests to each vendor in the form of documents. Upon receipt of an estimate request or an order request from the general affairs office, each vendor makes an estimate for the cost of delivering commodities, the term of delivery and if the commodities are kept in stock, or arranges delivery and makes out a bill, as required. In the case of an estimate request, a reply is sent in writing to the requesting general affairs office. In the case of an order request, the requested commodity and a bill are delivered to the general affairs office. The bill is counted towards the organizational costs by the general affairs office and the commodities are delivered to the requesting office. The results of an estimate request are also sent from the general affairs office to the requesting office.

In the conventional system, however, after an estimate request or an order request has been issued to a vendor, the only way of confirming that the vendor has received the request without fail is to inquire of the vendor by telephone.

In addition, since all matters are processed using paper, time consuming work is required. The task of the general affairs office that handles requests made by all the offices in an organization becomes complicated.

Furthermore, delivered articles or services are sometimes not inspected for a long time in the organization, delaying payment to vendors. In such a case, the general affairs office will have to carry out the extra work of handling many inquiries from the vendors.

SUMMARY OF THE INVENTION

It is an object of the present invention to provide a system which permits requests—either estimate requests or order requests—to vendors and for conditions related to requests to be understood easily, by communicating electronic data.

According to an aspect of the present invention,there is provided an electronic transaction system for making a request for estimating of making a request for ordering an article or service required by an organization to a vendor outside the organization comprising: a processing unit installed inside the organization and having input means for inputting a request and inputting information related to the request on the basis of information sent from the vendor after the request has been made; and a management unit for managing communications between the processing unit in the organization and a processing unit in the vendor company, the management unit including: information entry means installed inside the organization for entering data input by the input means of the processing unit in the organization; transmission means for transmitting the request entered into the information entry means installed in the organization and request-related data input later as requested by the processing unit in the vendor company; and entry means installed outside the organization for transmitting data used for the vendor to make a reply to the request as requested by the processing unit in the vendor company and entering data input and sent by the processing unit in the vendor company.

According to another aspect of the present invention, there is provided an electronic transaction system for making a request for ordering or a request for estimating articles or services required by an organization to vendors outside the organization comprising: first processing units installed in department offices of the organization for inputting requests and a second processing unit installed inside the organization for managing requests made by the first processing units, the second processing unit including management means for managing dates of delivery of articles or services input from processing units installed in the vendor companies and acceptance processing means for deciding, for each first processing unit that makes a new estimate request or order request, the presence or absence of order requests made by that first processing unit for which acceptance inspection of an article or service delivered has not been made within a predetermined period of time after its date of delivery and refusing the new request when the acceptance inspection has not been made.

According to still another aspect of the present invention, there is provided an electronic transaction management unit for managing communications between a processing unit installed inside an organization for making a request for estimating or a request for ordering an article or service and a processing unit installed in a vendor company outside the organization comprising: information entry means installed inside the organization for entering data input by the input means of the processing unit in the organization; transmission means for transmitting the request entered into the information entry means installed in the organization and request-related data input later as requested by the processing unit in the vendor company; and entry means installed outside the organization for transmitting data used for the vendor to make a reply to the request as requested by the processing unit in the vendor company and entering data input and sent by the processing unit in the vendor company.

According to the present invention, the management unit presents request conditions in such a way that they can be accessed from outside via a network, allowing outside vendors to easily know what the ordering organization needs. Thus, the vendors can immediately accommodate requests made by the orderer and use the request conditions to understand the conditions in which commodities and services have been delivered. This will simplify office work and reduce troubles in business.

The ordering organization makes requests public, which will provide the same advantages as a public tender. For this reason, the organization can receive estimates from two or more vendors and choose a vendor who provides the most advantageous conditions from among the vendors.

Conventionally, delivered articles or services are sometimes not inspected for a long time by the organization, delaying the payment to vendors. In such a case, the number of inquires from the vendors increases, which results in extra work for the handling of these inquiries. According to the present invention, this problem can be solved.

BRIEF DESCRIPTION OF THE DRAWINGS

FIG. 4 is a flowchart for processing of shipping and acceptance inspecting of a commodity by the organization office, the VAN center and the vendor;

FIGS. 6A through 6F show the stored contents of each database used in the system of the present invention;

FIG. 7 shows a display example of a home page menu which is displayed first when the vendor makes access to the estimate/order request system in the WWW server;

FIG. 8 shows a display example of a list of estimates;

FIG. 9 shows a display example of a page indicating the contents of an estimate request;

FIG. 10 shows a display example of a page for a reply to an estimate request;

FIG. 11 shows a display format of particulars in an estimate reply;

FIG. 12 shows a display example of a list of order acceptances displayed when the order acceptance option is chosen from the main menu of FIG. 7;

FIG. 13 shows a display example of a statement of delivery;

FIG. 15 shows a display example when the accounts payable information reception option is chosen from the main menu of FIG. 7; and FIG. 16 shows a display example when the list of estimate replies option is chosen from the main menu of FIG. 7.

DESCRIPTION OF THE PREFERRED EMBODIMENTS

Figure 1:
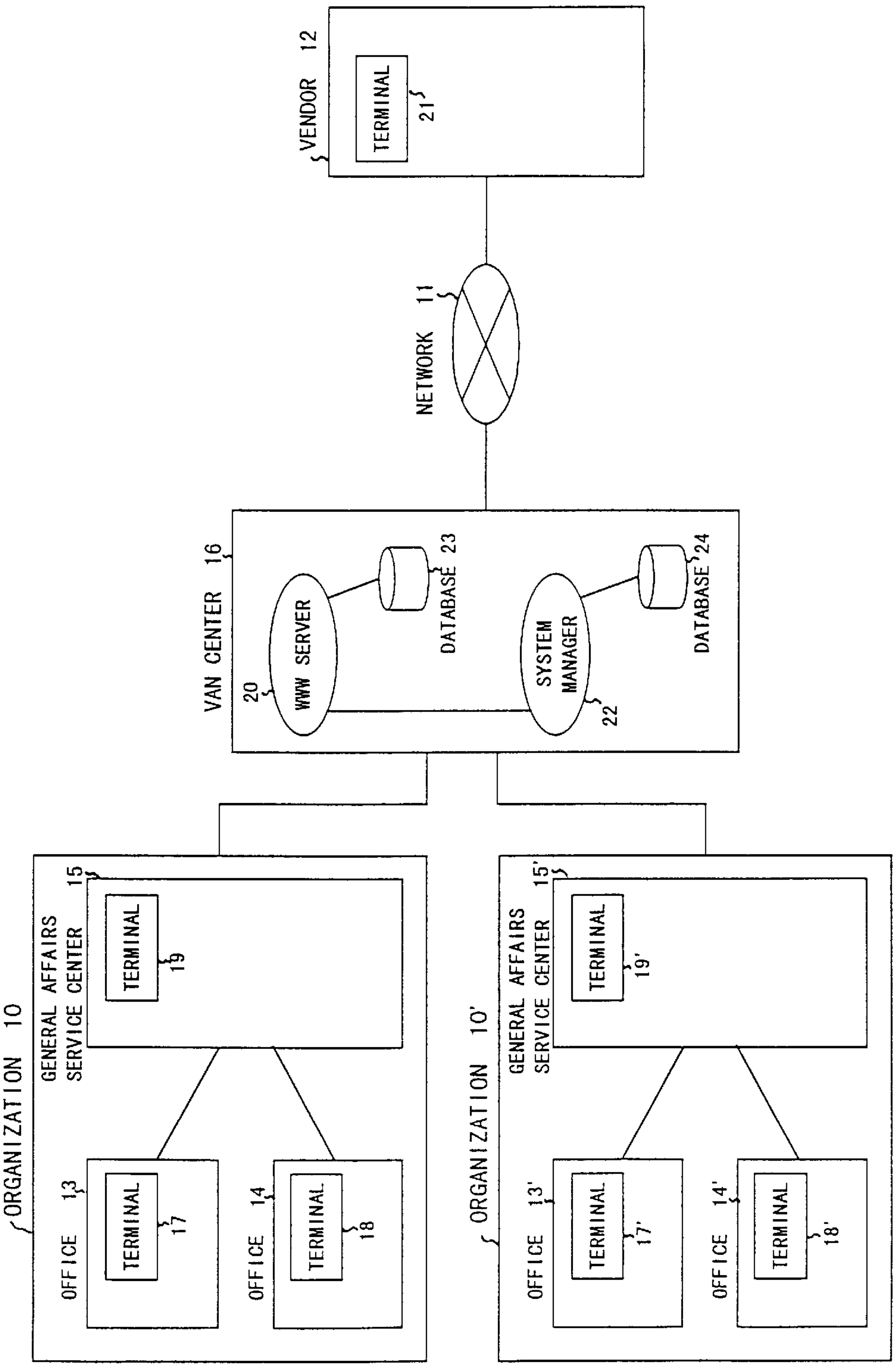
FIG. 1 is a schematic of a system of the present invention.

FIG. 1 is a schematic representation of an electronic transaction system of the present invention. In the following description, commodities shall include not only articles or goods but also services such as printing of brochures and the like, development of photographic film, etc.

Organizations 10 and 10' are such as enterprises or the like. Each organization has a plurality of department offices (hereinafter referred to simply as offices) 13 and 14 (13' and 14') and a general affairs service center 15 (15') that handles the general affairs for the offices. A VAN (Value-Added Network) center 16 may be arranged to handle the organizations 10 and 10' on a batch basis as shown; otherwise, a dedicated VAN center may be provided for each organization. The following description will be given bearing in mind that the VAN center handles two organizations. In the system of the present invention, the organizations 10 and 10' are connected to the VAN center 16 and are accessible via a network 11 by a vendor 12 with which the organizations do business. If a VAN center is provided exclusively for each of the organizations 10 and 10', it may be installed in the corresponding organization, for example, as a part of the facilities of the corresponding general affairs service center 15 or 15'.

The offices 13, 14, 13' and 14' and the general affairs service centers 15 and 15' have terminals 17, 18, 19, 17', 18' and 19' installed, respectively, which are connected by networks, such as LANs, for data communications. The VAN center is equipped with a system manager 22 which processes estimate requests from the organization 10 or 10' to a vendor 12 and so on and a WWW server 20 that is accessible by the vendor 12. With the system manager and the WWW server are respectively associated a database 23 and a database 24 which record estimate request information for each request.

In each office, a person in charge creates an electronic document for a request—either a request to estimate or a request to order a commodity—on the corresponding terminal and requests a manager to approve of it as it is, in the form of electronic data. Upon receipt of the approval of the manager, the person sends the request in the form of electronic data from the corresponding terminal to the terminal 19 (19') of the corresponding general affairs service center 15 (15'). When the request sent from the office is an estimate request, it is sent to the VAN center 16 as it is. In the VAN center, the request is recorded on the databases 23 and 24 and appears in a home page provided by the WWW server 20.

The vendor 12 makes access from its terminal 21 via the network 11 to the WWW server 20 in the VAN center 16, to see the home page. Thus, the vendor confirms that an estimate request has been made by the organization 10. In response to the estimate request, the vendor makes an estimate for the commodity and then sends the results to the terminal 19 of the general affairs service center 15 via the VAN center 16. In the VAN center, that a reply has been made to the estimate request is entered into the databases 23 and 24. The general affairs service center sends the results of the estimate to the terminal of the office that made the estimate request.

In the case of an order request for a commodity, on the other hand, the general affairs service center first issues an estimate request to the vendor before the corresponding order request is made. That estimate request is processed in the same manner as described previously. Upon receipt of the results of the estimate, the service center makes an order request to a vendor after evaluation of the results. This order request is made by sending a notification to the home page of the WWW server data to the effect that an order request is made to a specific vendor. If the ordering office has already received the results of the estimate, data to that effect is sent to the service center together with an order request. The evaluation made by the general affairs service center of the results of an estimate is one for, when two or more vendors 12 have sent the results of their estimates for an estimate request, deciding with which vendor an order is to be placed on the basis of evaluation criteria such as the total cost, item, discount amount, etc., as in the case of a public tender. In practice, the terminal in the general affairs service center can be set to automatically decide which vendor fulfills the evaluation criteria and then to make an order request to that vendor. At the same time, the person in charge and the management in the general affairs service center examine the data and make a decision, print the results as documentary evidence, and send the order request to the WWW server. When the automatically sent order request, and the order request sent after the examination and the decision are received, they are displayed in the home page of the WWW server 20, thus allowing the vendor 12 to know that an order request has been issued to it.

Upon receipt of an order request, the vendor prepares the commodity for shipment. On completion of the shipment, the vendor sends from the terminal 21 through the network 11 to the VAN center 16 shipment information to the effect that the commodities have been shipped. The shipment information is entered into the databases 23 and 24 in the VAN center 16 and sent to the terminal in the ordering office via the service center. When the ordered commodities are delivered to the ordering office, a message that the commodities have been accepted is sent from the ordering office to the general affairs service center. Acceptance inspection is notified on the terminal 19 and the price of the commodities is appropriated to the organization's expenditure. The results of the acceptance inspection and the appropriation are sent as inspection data and accounts payable data to the VAN center 16 where they are entered into the databases 23 and 24 and appear in the home page of the WWW server 20.

Thus, a series of estimate and order requesting processes terminates. The message format and protocol used in the present system conform to the EDI (Electric Data Interchange) standardized in various industrial fields.

Figure 2:
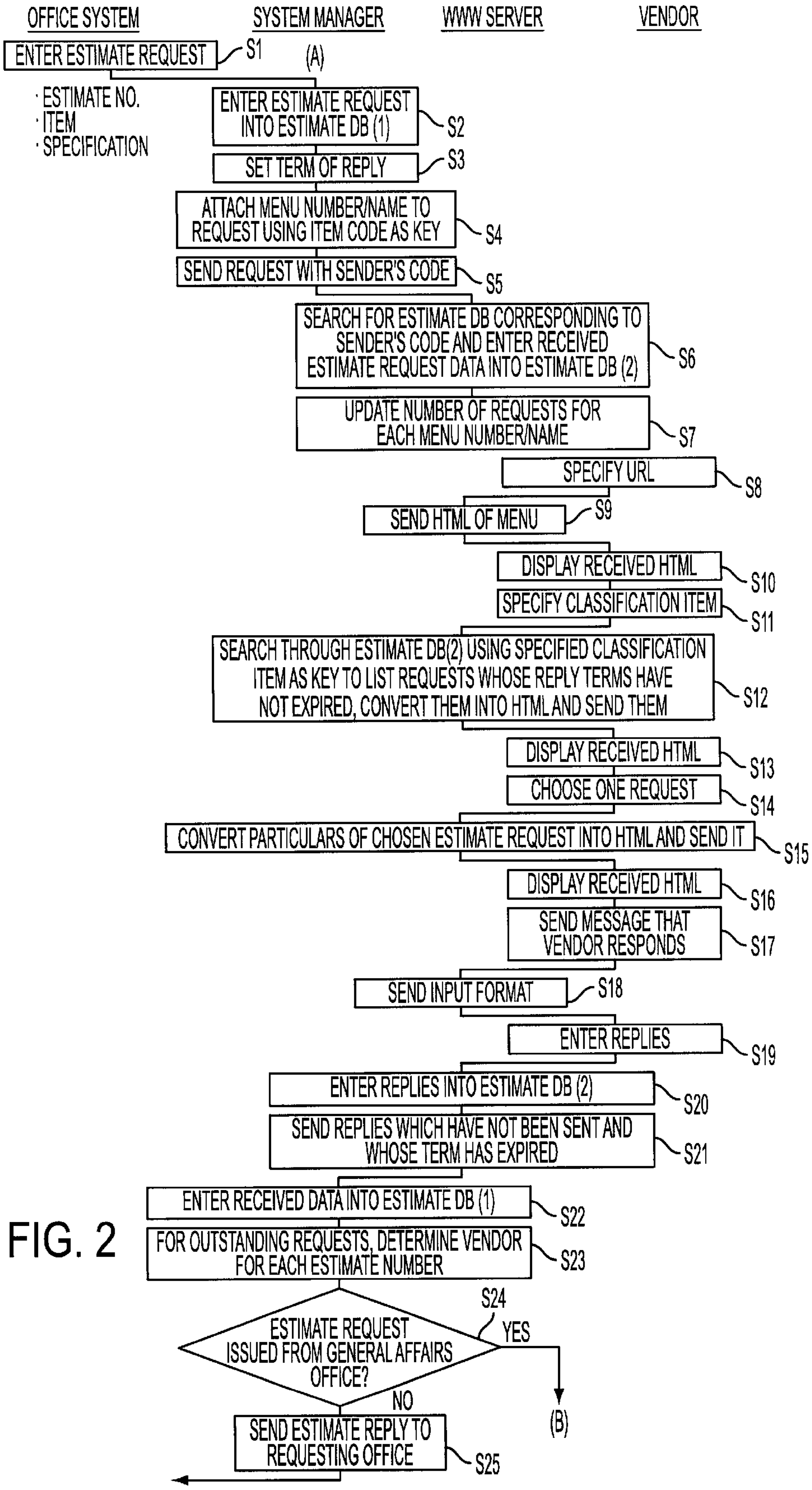
FIG. 2 is a flowchart for estimate processing by the system in each organization office, the system manager and the WWW server in the VAN center, and the vendor's terminal.

FIG. 2 is a flowchart for estimate processing among each office-installed system, the system manager and WWW server in the VAN center, and the vendor terminal.

In the first place, an estimate request is entered from the office system (terminal). Input data items at this time include estimate number, item, and specification. In step S2, the estimate request entered from the office system is sent to the system manager where it is entered into a database (1) that records estimate requests. In step S3, the term of reply for the estimate request is set by the personnel in the general affairs service center. In step S4, a menu number or name is attached to the estimate request using an item code of the item contained in the estimate request as a key.

The estimate request with the estimate reply term and the menu number/name attached is sent to the WWW server together with a sender's code (step S5). The WWW server searches for an estimate database (2) corresponding to the sender's code and enters the received estimate request data into it (step S6). This is intended to manage request conditions for each requester. In step S7, the menu number/name is retrieved from the estimate request data and the number of requests corresponding to the menu number/name is updated. Thus, the WWW server allows the estimate request to appear in its home page.

The vendor specifies the URL of the home page of the WWW server in which menu items appear (step S8) to make access to the server. The WWW server then sends to the vendor the HTML data of the home page in which the menu items appear (step S9). On the vendor side, the received HTML data is displayed (step S10) and a desired classification item the vendor wants to see is specified in the displayed menu (step S11). The WWW server is notified of the specified classification item and then searches through the estimate database (2) using the specified classification item as a key to list requests whose terms of reply have not expired. The requests are converted into HTML data and then sent to the vendor (step S12).

On the vendor side, the received HTML data is displayed (step S13) and one request is chosen from the list (step S14). The chosen request is sent to the WWW server. The server converts the particulars of the chosen estimate request into HTML data and sends it to the vendor (step S15). On the vendor side, the received HTML data is displayed (step S16). If no reply is made to the request, access to the WWW server is terminated. If the vendor responds to the estimate request, a message to that effect is sent to the WWW server (step S17). Upon receipt of the message to the effect that the vendor will respond to the estimate request, the WWW server sends an input format for reply to the vendor (step S18). Upon receipt of the input format, the vendor enters its replies (step S19) for transmission to the WWW server.

Upon receipt of the reply to the estimate request, the WWW server enters it into the estimate database (2) (step S20). Of replies to estimate requests which have already been recorded in the database (2), those which have not been sent to the system manager or those for which the term has expired are sent to the system manager (step S21).

In the system manager, data received from the WWW server is entered into the estimate database (1) (step S22). For outstanding replies entered into the estimate database (1), a vendor is determined for each estimate number attached in the offices (step S23). This processing is one to narrow down a plurality of vendors who have replied to one estimate request to one, taking into consideration predetermined conditions (the price, the term of delivery, etc.). In step S24, a decision is made as to whether or not the estimate request has been issued from the general affairs service center. If it has, then ordering and order accepting processing, to be described later, are performed. If it has not, the reply to the estimate is sent to the office that made the estimate request.

Figure 3:
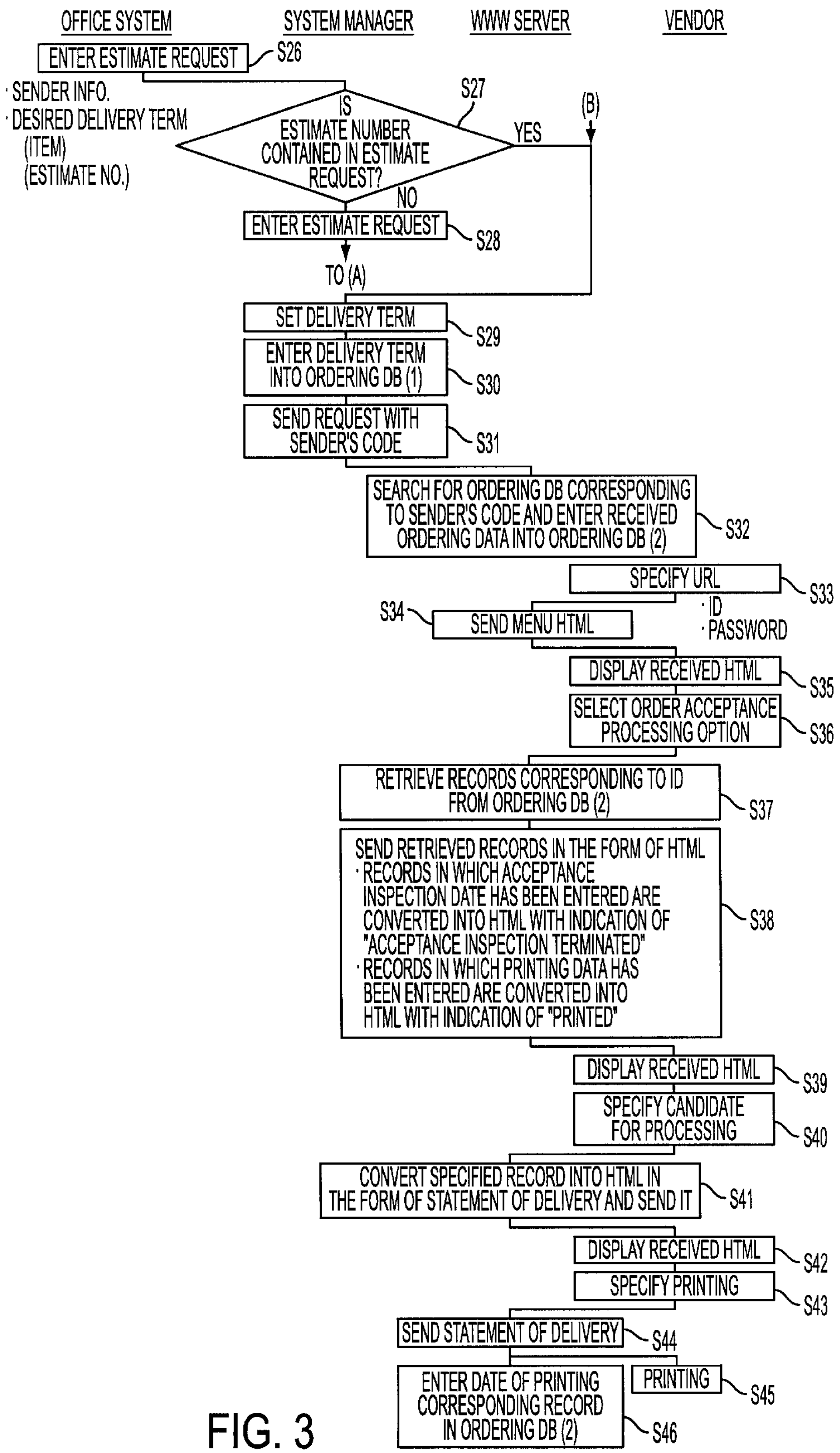
FIG. 3 is a flowchart for ordering and order acceptance processing by the organization office, the VAN center, and the vendor.

FIG. 3 is a flowchart for the ordering and order accepting processing among the office system, the VAN center, and the vendor.

In step S26, a request to order a commodity is input and then sent to the system manager. Data items on the order request includes requester information, desired term of delivery, item, and so on. If an estimate request has been made previously and a reply has been obtained from a vendor, an estimate number is also contained in the data items.

Upon receipt of the order request from the office system, the system manager determines whether or not an estimate number is contained in the order requesting message (step S27). If it is not, the procedure goes to step S28 where an estimate request is entered in the general affairs service center. The steps that follow step S1 in FIG. 2 are then performed. If, on the other hand, an estimate number is contained, the procedure goes to step S29. When a reply to the estimate request made in step S28 is received, the procedure goes to steps S24 to S29 of FIG. 2.

In step S29, the person in charge in the service center set the term of delivery and, in step S30, it is entered into an ordering database (1). The order request is then sent to the WWW server with the sender's code appended (step S31). The WWW server searches for an ordering database (2) corresponding to the sender's code and enters the ordering request (purchase request) into the ordering database (2) (step S32).

The vendor specifies the URL of the WWW server to access it (step S33). It is recommended that the vendor be allocated an ID and a password in advance and allowed to make access to the menu of the WWW server only when the vendor inputs the correct ID and password so that unauthorized access to the WWW server cannot be made by those who have nothing to do with the commodity ordering and order accepting system of the WWW server.

When accessed by the vendor, the WWW server sends the HTML data of the menu to the vendor (step S34). On the vendor side, the received HTML data is displayed (step S35), and the "order acceptance processing" option is selected in step S36. On receiving notification that the "order acceptance processing" option has been selected, the WWW server retrieves records corresponding to the vendor's ID from the ordering database (2) (step S37). In subsequent step S38, the retrieved records are sent to the vendor in the form of HTML data. At this point, the HTML data is created with indications of "acceptance inspection terminated" for records in which the date of acceptance inspection has been entered, and "printed" for records in which the date of printing has been entered.

On the vendor side, the received HTML data is displayed (step S39), and a candidate for order acceptance processing is specified in the displayed list of records (step S40). The WWW server converts the record in the ordering database (2) corresponding to the specified candidate for processing into HTML data in the form of a statement of delivery and then sends it to the vendor (step S41). On the vendor side, the received HTML data is displayed (step S42) and printing is then specified (step S43). In response to this, the WWW server sends a statement of delivery (step S44). The statement is then printed on the vendor side (step S45). The WWW server enters the date of printing into the record in the ordering database (2) (step S46).

FIG. 4 is a flowchart for shipment and acceptance inspection processing among the office system, the VAN center, and the vendor.

The vendor specifies the URL of the WWW server and enters its ID and password to make access to the WWW server (step S47). The WWW server sends the HTML data of the menu to the vendor (step S48). On the vendor side, the received HTML data is displayed on its terminal in step S49. The "shipment" option is selected from the displayed menu (step S50). In response to this, the WWW server sends the HTML data of a page for shipment processing to the vendor (step S51).

On the vendor side, the received HTML data is displayed (step S52) and a slip number of the statement of delivery obtained by the processing of FIG. 3 is input (step S53). Upon receipt of the slip number, the WWW server retrieves a record corresponding to the slip number from the ordering database (2) (step S54) and then sends that record converted into HTML data to the vendor (step S55). On the vendor side, the received HTML data is displayed (step 56) and the date of shipment is then entered (step S57). The WWW server placed the date of shipment in the corresponding record in the ordering database (2) (step S58). That record which has not yet been sent but contains the date of shipment is sent to the system manager (step S59). The system manager then updates the ordering database (1) on the basis of the received record (step 60). The system manager sends to the office system that record which, of records in the ordering database (1), has not been sent yet and contains the date of shipment (step S61). On the office side, the date of acceptance is entered into the received record (step S62) and that record is then sent to the system manager. The system manager then updates the ordering database (1) on the basis of the received record (step 60). The system manager sends to the office system that record which, of records in the ordering database (1), has not been sent yet and contains the date of shipment (step S61). On the office side, the date of acceptance is entered into the received record (step S62) and that record is then sent to the system manager.

Upon receipt of the date of acceptance, the system manager enters the date of acceptance inspection in the corresponding record in the ordering database (1) (step S63). In step S64, the system manager retrieves the record which has not yet been sent to the WWW server and contains the date of acceptance inspection, and sends it to the WWW server with the sender's code set (step S65). The WWW server searches for the ordering database (2) corresponding to the sender's code set in the received record and then enters the date of acceptance inspection, in the corresponding record in the ordering database (2) (step S66).

Note that the HTML documents are sent to the vendor in the FORM format for data entry.

Figure 5:
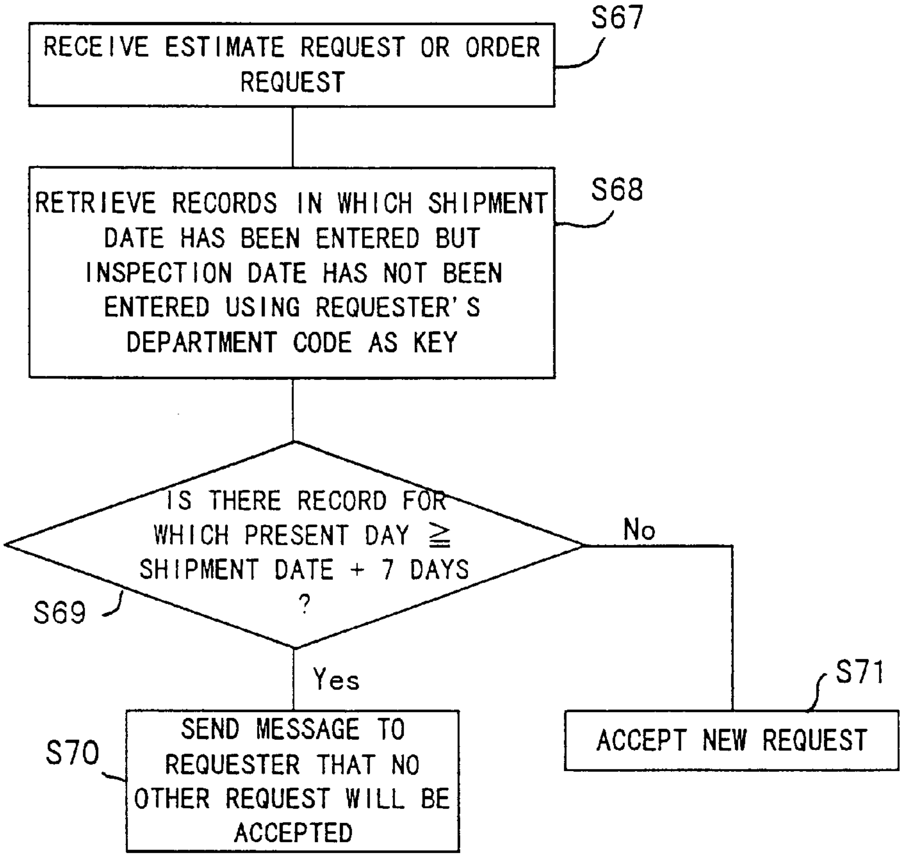
FIG. 5 is a flowchart for processing in the case of stopping acceptance of a new request when there is a request for a commodity for which acceptance inspection has not been made for a predetermined period of time.

FIG. 5 is a flowchart for processing of, in addition to the processing described in conjunction with FIGS. 2, 3 and 4, refusing additional requests in the case where there is a request in which acceptance inspection of commodities has not been made for a predetermined period of time.

The processing of FIG. 5 is performed prior to step S2 of FIG. 2 or step S27 of FIG. 3. When an estimate request is input in step S1 of FIG. 2 or a purchase request is input in step S26 of FIG. 3, the estimate request or order request is received in step S67. When either request is received, records in which the date of shipment has been entered but the date of acceptance inspection has not been entered are retrieved using the requester's department code as a key (step S68). In subsequent step S69, it is determined whether or not there is a record for which the present date is seven days or more after the date of shipment. This determination allows confirmation that there is a request for which acceptance inspection of a commodity has not yet been made, even after a lapse of seven days from the date of shipment. If the determination is No in step S69, then all the requests corresponding to the department's code are considered to have acceptance inspection made already within seven days after the date of shipment. In this case, a new request is accepted (step S71), and the procedure then goes to step S2 of FIG. 2 or step S27 of FIG. 3. On the other hand, if the determination in step S69 is that there is a request for which acceptance inspection has not been made within seven days after the date of shipment, a message to the effect that no other request will be accepted is sent to the requester (step S70).

FIGS. 6A through 6F show the storage contents of the respective databases provided in the system of the present invention.

FIG. 6A shows the storage contents of the classification database which manages the classification of commodities which are estimated and ordered. Each menu is numbered and hence identified by a number. A menu name is associated with each menu number and they are entered with a correspondence therebetween. In the case of FIG. 6A, examples of menus include "books", "stationery", and "printing".

In each menu are entered items for classifying commodities in detail. This database is provided in the system manager, by way of example.

FIG. 6B shows the stored contents of the estimate database (1) provided in the system manager.

Each estimate request is assigned an estimate number. In this database, the contents of each estimate request are entered with its estimate number as a key. In the example of FIG. 6B, "B1" is entered as an item code of a commodity and "pencil" is entered as an item's name corresponding to the item code. Specification indicates detailed information about pencils. In the figure, it indicates an estimate request for HB pencils manufactured by a certain company. In addition, the desired date of delivery and the desired date of reply to the estimate request are entered. Finally, the corresponding menu number and menu name shown in FIG. 6A are described.

FIG. 6C shows the stored contents of the estimate database (2) provided in the WWW server.

The estimate database (2) stores basically the same data items (data fields) as the estimate database (1), but it has an additional data item of the date of transmission from which whether or not the estimate reply from the vendor has been sent to the system manager can be judged. That is, the estimate request having the estimate number "0101" is one for a commodity in which the item code is "A1", the item name is "Japanese book", and the specification indicates a book entitled "An Introduction to HTML". The time limit for delivery of the commodity is set to Oct. 10, 1997, and the term for the estimate reply is set to Sep. 20, 1997. The menu number is set to "01" and the menu name is set to "book". The estimate database (2) includes the data item of the date of transmission for each estimate number (estimate request) as described above. In the example of FIG. 6C, no date is entered in the "transmission date" field. It is thus seen that no reply has been sent to the system manager for any estimate request. It is when a reply is sent from the WWW server to the system manager that the date of transmission of this reply is entered in the "transmission date" field.

As described previously, it is only for estimate requests for which the "transmission date" field is empty or the term of reply has not expired that replies are sent from the WWW server to the system manager. In sending a reply to a request for estimate to the system manager, the WWW server determines which estimate request the reply corresponds to on the basis of the estimate number and checks the fields of "term of reply" and "transmission date" to make sure that the term has not expired and the "transmission data" field is empty.

FIG. 6D shows the stored contents of a number-of-requests database in which the number of estimate requests are entered, the database being provided in the WWW server.

In the case of FIG. 6D, the number of estimate requests is counted for each menu. The example of FIG. 6 indicates that the number of estimate requests for the menu "01" for books is one. Likewise, the number of estimate requests for the menus "03" and "04" for printing and taking a photograph is indicated to be zero. This database can be used to manage the present condition in which how many estimate requests have been made by the whole organization for which commodities, is stored. In addition, since that an estimate request is made for a certain commodity means that the commodity is necessary for business, the database can be used to examine the tendency for commodities to become necessary for business by subsequent statistical processing of the number of requests for each menu.

FIG. 6E shows the stored contents of the ordering database (1) provided in the system manager.

The records in the ordering database (1) are organized by slip number, which is attached to each purchase request. Each record contains fields: item, item name, specification, quantity, unit, term of delivery, vendor code, and vendor name identified by the code. In addition to these fields, the record contains fields: shipment date which is entered by data transmission from a vendor, date of acceptance inspection made by the general affairs service center, and date of transmission which is entered by sending data to the office system for acceptance inspection and later notifying the WWW server of the date of acceptance inspection.

As described previously, the shipment date is entered when the system manager receives notification from the WWW server that the vendor has shipped a commodity. Likewise, the date of acceptance inspection is entered when receiving a notification that the acceptance inspection was made, and the date of transmission is entered when the WWW server is notified of the data of acceptance inspection.

FIG. 6F shows the stored contents of the ordering database (2) provided in the WWW server.

The contents entered into the database (2) are the same as those in the database (1) except that the date of printing is added as a data item to be entered. The printing date field is provided to record the date on which a statement of delivery was printed by the vendor which accepted an order, indicating that a transaction has been arranged. The field of date of shipment is completed when receiving data on the date on which a commodity was shipped from the vendor. The date of shipment is first entered into the database (2) and then into the database (1) in the system manager. The date of acceptance inspection is first entered into the database (1) and then into the database (2). The other data items are the same as those in the database (1).

FIG. 7 shows a display example of a menu on the home page that is displayed first when the vendor makes access to the estimate request/ordering system in the WWW server.

In this example, the main menu contains a list of options: estimate request, order acceptance processing, shipment information transmission, accounts payable information reception, and a list of estimate replies. In particular, below the estimate request option are displayed item names and the number of estimate requests for each item, from which a vendor can know what types of commodities the organization needs for business. The names of items include book, taking a photograph, development, outside repair, translation/typing, fixtures, sundries, stationery, date stamp, printing, signboard/panel, and others. When the vendor wants to see the details of an estimate request for an item, it is possible to open the next page by clicking the corresponding item name by the use of a mouse.

FIG. 8 shows a display example of a list of estimate requests.

This example displays a list of estimate requests for books. The list contains data items: the office that made an estimate request, item name, commodity number maker name, quantity, unit, and term of reply. For example, from the figure it is known that the main office has a demand to purchase 10 copies of a book entitled "Visual Basic 4 Self-Master Book" and wants to receive the results of estimates before Jun. 11, 1997. In order to obtain detailed estimate request information, a vendor simply clicks the corresponding item name with a mouse.

FIG. 9 shows a display example of a page indicating the contents of an estimate request.

For example, this page is opened by clicking an item name in FIG. 8. The contents contain the requester's name, the date of request, the extension and phone numbers, and so on in addition to the item name and quantity. The vendor makes a decision of whether or not to make a reply to the request on the basis of the request contents. Depending on circumstances, it may take some time to estimate. In such a case, the vendor stops access temporarily to make an estimate. On completion of the estimate, the vendor makes access to the page shown in FIG. 9 again and then clicks the "go to estimate reply" option in the lower portion of the drawing.

When the estimate can be made immediately, the vendor may click the "go to estimate reply" option and go to a page for estimate reply.

FIG. 10 shows a display example of the page for an estimate reply. In the estimate reply page are listed data items that need to be answered. The vendor simply enters the result of the estimate for each data item. The data items for reply contain list price, discount rate, amount, days for delivery after ordering, and so on. These items are used for the general affairs service center to decide whether the contents of the estimate reply received meet the evaluation criteria. When estimate replies are received from two or more vendors, the items can be used as criteria for determining with which vendor a satisfactory deal can be made.

It is also possible to attach information on particulars to the estimate reply. In this case, "YES" is selected in the "particulars attached" item at the bottom of FIG. 10.

FIG. 11 shows a display format of the particulars in the estimate reply.

The contents of FIG. 11 are displayed to follow on from the bottom of FIG. 10. To attach particulars, the vendor simply fills in such a displayed form as shown in FIG. 11. By clicking a Transmit button placed at a portion indicated by (23) or (24) at the bottom of FIG. 11, the entered estimate reply is sent to the WWW server. If the Transmit button is placed at a portion (23), a Clear button used for data reentry may be placed at portion (24).

FIG. 12 shows a display example of a list of order acceptances which is displayed when the "Order Acceptance Processing" option is selected from the main menu shown in FIG. 7.

Each record to be displayed contains fields labeled slip number, item name, quantity, unit, desired delivery term, condition, and acceptance inspection date. Watching this display, the vendor can accept an order for an item for which the condition field is described "not outputted". That is, the Situation field described as "outputted" indicates that the order for the corresponding item has been already accepted and a statement of delivery has been outputted. Thus, it is not necessary to accept this order anew. The condition field described as "acceptance inspected" indicates that the corresponding item has been delivered and the recipient has made acceptance inspection. It is also unnecessary to accept the order for this item anew.

Thus, according to the system of the present invention, vendors can understand the conditions of commodities which they have delivered or for which they have accepted orders, which prevents vendors from accepting an order twice and allows the office work to be speeded up.

Therefore, to accept an order for a commodity, vendors simply carry out the procedure of searching through the records in the list of order acceptances for a commodity for which the condition field is described as "not outputted" and clicking its name to display and output a statement of delivery.

FIG. 13 shows a display example of a statement of delivery.

Required items are entered by the orderer on this statement of delivery. The vendor prints this statement and then sends it to the orderer together with a commodity shipped. On the other hand, the orderer confirms that the statement of delivery has been printed and then enters the date on which it was printed in the date of printing field in the ordering database (2). Thereby, a display of "outputted" is made in the condition field of the list of order acceptances of FIG. 12, indicating the order for the corresponding commodity has been accepted.

Figure 14:
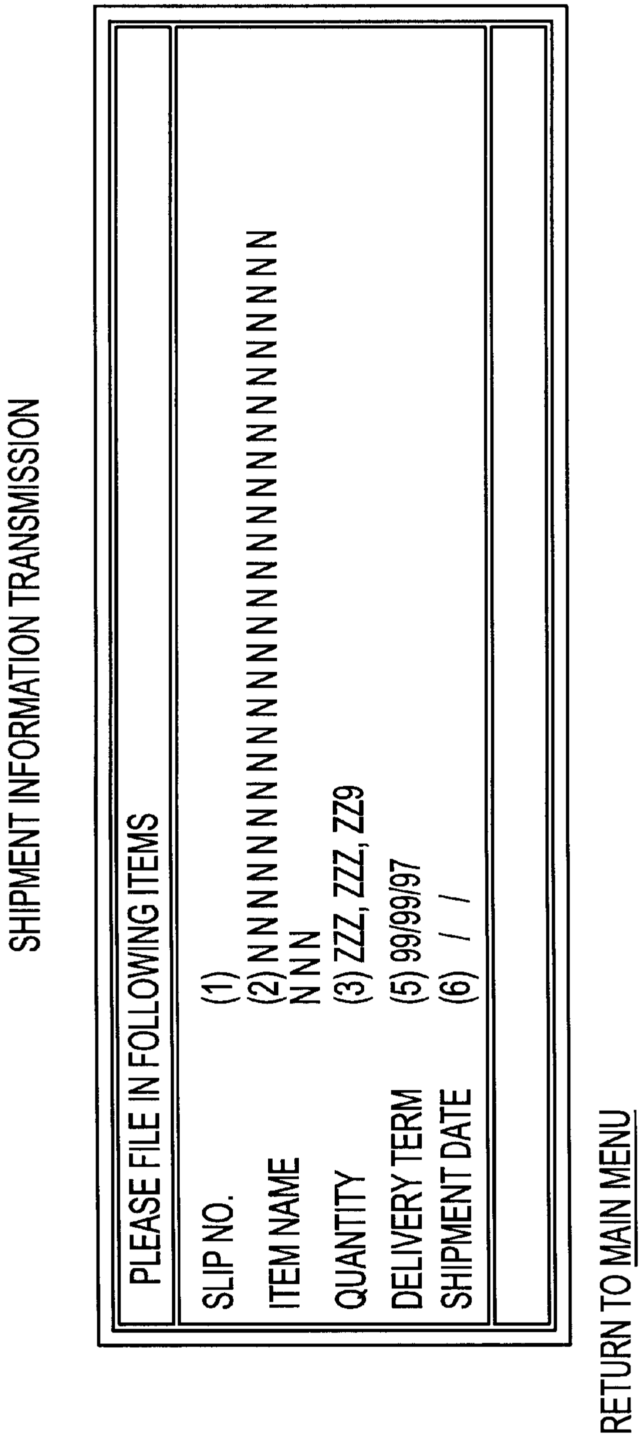
FIG. 14 shows an example of a display for entry of required items when the vendor sends shipping information to the orderer.

FIG. 14 shows an example of a display for entry of required items when a vendor sends shipment information to the orderer.

When the Shipment Information Transmission option is selected by clicking from the main menu of FIG. 7, a display such as shown in FIG. 12 is made. In shipping a commodity, the vendor sends this shipment information to notify the orderer that the commodity has been shipped with certainty. The input data items include slip number, item name, quantity, delivery term, and date shipped. The vendor fills in the blanks for transmission to the orderer. The slip number is used for the orderer to identify the order request for the commodity which has been accepted. The shipment information contains the date of shipment, which is recorded in the ordering databases (1) and (2) on the orderer side. Thus, the orderer can verify the date on which the commodity was shipped from the vendor.

FIG. 15 shows an example of a display when the Accounts Payable Information Receive option is selected from the main menu of FIG. 7.

As shown in FIG. 15, each transaction is treated by slip number, and quantity, unit, item, unit price, amount, date accepted, consumption tax, date acceptance inspected, and amount paid are displayed. This displayed table indicates that the payment for the commodities shown in FIG. 15 was completed on the date paid shown.

Such a table allows the vendor to confirm at a glance the dates on which commodities were accepted by the orderer and the dates on which the payment was made. This eliminates the need for the vendor to make inquiries to the orderer, allowing office work to be simplified.

FIG. 16 shows an example of a display when the list of estimate replies option is selected from the main menu of FIG. 7.

In the table of FIG. 16 are displayed the results of estimates for commodities as replied to the orderer by a vendor. The list contains the fields: department, item, type number, maker name, quantity, unit, and reply term. The vendor can verify the contents of the estimate replies made to the orderer and confirm that the estimate replies were forwarded to the orderer. In addition, the fact that the orderer and the vendor share data provides an advantage of preventing the occurrence of trouble therebetween due to a conflict in business conditions.

Furthermore, the vendor can click an item name to see the details of an estimate reply made by itself. The details of an estimate reply may be in the same format as in FIG. 10, but a new display format may be created.

Although the present invention has been described in terms of a specific example, it is apparent that other embodiments and modifications are possible.

According to the present invention, the orderer and the vendor can verify common business information, reducing the possibility of trouble which might occur therebetween.

Since the orderer presents business information to the vendor in the form of data, the number of documents can be reduced to prevent the waste of paper.

Since business information appears in the home page of the WWW server, a versatile system can be implemented which does not need any special equipment to be installed in vendor systems. That is, the vendor systems do not need to install any other software than a browser.

In particular, since the displayed business information contains information as to whether or not acceptance inspection was made by the orderer, the vendor can easily confirm that a commodity was delivered to the orderer, and the payment for the commodity was made, without fail.

Conventionally, delivered articles or services are sometimes not inspected for a long time by an organization, delaying the payment to vendors. In such a case, inquiries from the vendors increase, which results in extra work for handling the inquiries. According to the present invention, this problem can be solved.

What is claimed is:

1. An electronic transaction system for making a request for estimating or ordering an article or service required by an organization to a vendor outside the organization comprising:

a processing unit installed inside the organization and having input means for inputting an estimate or order request in order to exhibit the estimate or order request to a plurality of vendors outside of the organization, wherein, when the request is an estimate request and replies to the estimate request are obtained from two or more vendors, an order request is automatically made to a vendor that fulfills predetermined evaluation criteria, and wherein a new order request is refused when a previously ordered and delivered article or service is indicated as not having been inspected for acceptance; and a management unit for managing communications between the processing unit in the organization and a processing unit in the vendor company, the management unit including:

information entry means installed inside the organization for entering data input by the input means of the processing unit in the organization;

transmission means for transmitting the estimate or order request entered into the information entry means installed in the organization and request-related data input later as requested by the processing unit in the vendor company; and entry means installed outside the organization for transmitting data used by the vendor to make a reply to the estimate or order request as requested by the processing unit in the vendor company and entering data input and sent by the processing unit in the vendor company.

2. The electronic transaction system according to claim 1, wherein the both the entry means installed inside and outside the organization store data indicating that acceptance inspection of the article or service has been made in the organization, and the management unit presents that data in the entry means installed inside or outside the organization together with the data related to the request.

3. The electronic transaction system according to claim 1, wherein when the vendor accepts the order, the management unit allows the processing unit installed in the vendor company to print a statement of delivery.

4. The electronic transaction system according to claim 1, wherein the management unit obtains the date on which the vendor delivered the article or the service from the vendor and stores it in the entry means installed inside and outside the organization.

5. An electronic transaction system for making a request for ordering articles or services required by an organization to vendors outside the organization comprising:

first processing units installed in department offices of the organization for inputting order requests and a second processing unit installed inside the organization for managing estimate or order requests made by the first processing units, wherein when the request is an estimate request and replies to the estimate request are obtained from two or more vendors, an order request is automatically made to a vendor that fulfills predetermined evaluation criteria, and wherein the second processing unit including management means for managing dates of delivery of articles or services input from processing units installed in the vendor companies and acceptance processing means for determining, for each first processing unit that makes a new estimate or order request, the presence or absence of order requests made by that first processing unit for which acceptance inspection of an article or service delivered has not been made within a predetermined period of time after its date of delivery and refusing the new request when the acceptance inspection has not been made.

6. An electronic transaction management unit for managing communications between a processing unit installed inside an organization for making a request, which is one of an estimate request and an order request, for an article or service and a processing unit installed in a vendor company outside the organization comprising:

information entry means installed inside the organization for entering data input by the input means of the processing unit in the organization;

transmission means for transmitting the request entered into the information entry means installed in the organization and request-related data input later as requested by the processing unit in the vendor company, wherein if, when an order for an article or service is sent to the vendor, and an estimate reply has not been obtained from the vendor, a request to estimate the article or service is made to the vendor before the order is sent and the order is then sent after a reply to the estimate request has been received, wherein when replies to the estimate request are obtained from two or more vendors, an order request is automatically made to a vendor that fulfills predetermined evaluation criteria, and wherein a new order request is refused when a previously ordered and delivered article or service is indicated as not having been inspected for acceptance; and entry means installed outside the organization for transmitting data used by the vendor to make a reply to the estimate or order request as requested by the processing unit in the vendor company and entering data input and sent by the processing unit in the vendor company.

7. The electronic transaction management unit according to claim wherein the management unit manages communications made by a plurality of organizations in relation to the request.

8. A computer-readable storage medium for allowing a computer to perform a process comprising:

managing estimate requests or order requests made by first processing units installed in a plurality of departments in an organization;

managing dates of delivery of articles or services input by processing units installed in vendor companies outside the organization in response to order requests made by the first processing units; and for a first processing unit that makes a new estimate or order request, deciding the presence or absence of an order request for which acceptance inspection of an article or service delivered has not been made within a predetermined period of time after its date of delivery and refusing acceptance of the new request when the acceptance inspection has not yet been made, wherein when the request is an estimate request and replies to the estimate request are obtained from two or more vendors, an order request is automatically made to a vendor that fulfills predetermined evaluation criteria.

9. A computer-readable storage medium for allowing a computer to perform the functions of:

entering data input by input means of a processing unit installed inside an organization;

transmitting a request which is one of an estimate or order request entered and data related to the request input later as requested by a processing unit installed in a vendor company outside the organization, wherein if, when an order for an article or service is sent to the vendor, and an estimate reply has not been obtained from the vendor, a request to estimate the article or service is made to the vendor before the order is sent and the order is then sent after a reply to the estimate request has been received, wherein when replies to the estimate request are obtained from two or more vendors, an order request is automatically made to a vendor that fulfills predetermined evaluation criteria, and wherein a new order request is refused when a previously ordered and delivered article or service is indicated as not having been inspected for acceptance; and transmitting data used by the vendor to make a reply to the request as requested by the processing unit in the vendor company and entering data input and transmitted by the processing unit in the vendor company.

10. An electronic transaction system for making a request, which is one of an estimate request and order request, for an article or service required by an organization, comprising:

a processing unit inputting the request;

a communication unit communicating the request to a plurality of vendors;

an information management unit receiving information from the vendors related to the request; and an order processing unit inputting an order in response to the received information, wherein if, when an order for an article or service is sent to the vendor, and an estimate reply has not been obtained from the vendor, a request to estimate the article or service is made to the vendor before the order is sent and the order is then sent after a reply to the estimate request has been received, wherein when replies to the estimate request are obtained from two or more vendors, an order request is automatically made to a vendor that fulfills predetermined evaluation criteria, and wherein a new order request is refused when a previously ordered and delivered article or service is indicated as not having been inspected for acceptance.

11. A method for fulfilling requests by an organization, comprising:

entering an electronic request for an estimate or an order for an article or service;

electronically exhibiting the request to at least one vendor;

receiving over a network replies from vendors in response to the request;

determining whether one of the received replies meets the requirements of the organization; and submitting an electronic order for the article or service if the one of the received replies meets the requirements of the organization, wherein if, when an order for an article or service is sent to the vendor, and an estimate reply has not been obtained from the vendor, an electronic request to estimate the article or service is made to the vendor before the order is sent and the order is then sent over the network after a reply to the estimate request has been received, wherein when replies to the estimate request are obtained from two or more vendors, an order request is automatically made to a vendor that fulfills predetermined evaluation criteria, and wherein a new order request is refused when a previously ordered and delivered article or service is indicated as not having been inspected for acceptance.

12. A method for fulfilling a request for a bid, comprising:

entering a request for a bid to acquire an article or service;

accessing the request by suppliers across a network; and transmitting responses to the request across the network from the suppliers, wherein if, when an order for an article or service is sent to the supplier, and an estimate reply has not been obtained from the supplier, a request to estimate the article or servicea is made to the vendor before the order is sent and the order is then sent after a reply to the estimate request has been received, wherein when replies to the estimate request are obtained from two or more suppliers, an order request is automatically made to a supplier that fulfills predetermined evaluation criteria, and wherein a new order request is refused when a previously ordered and delivered article or service is indicated as not having been inspected for acceptance.

13. The method for fulfilling a request according to claim 12, wherein the network includes the Internet.

14. The method for fulfilling a request according to claim 12, wherein the method comprises a business to business electronic commerce transaction.

15. The method for fulfilling a request according to claim 12, wherein the request and the responses are stored in a database.

16. A method for fulfilling a request for a bid, comprising:

entering a request for a bid to acquire an article or service;

accessing the request by suppliers across a network, wherein the network includes the Internet;

transmitting responses to the request across the network from the suppliers;

determining whether one of the responding suppliers fulfills predetermined evaluation criteria;

storing the request and the response in a database; and entering an order for the article or service for the one of the responding suppliers that was decided to fulfill the predetermined evaluation criteria, wherein if, when an order for an article or service is sent to the supplier, and an estimate reply has not been obtained from the supplier, a request to estimate the article or service is made to the vendor before the order is sent and the order is then sent after a reply to the estimate request has been received, wherein when replies to the estimate request are obtained from two or more suppliers, an order request is automatically made to a supplier that fulfills predetermined evaluation criteria, and wherein a new order request is refused when a previously ordered and delivered article or service is indicated as not having been inspected for acceptance.

17. A method for implementing a business to business electronic marketplace, comprising:

soliciting estimates for fulfilling a requirement of the first business, by sending an estimate request from the first business to a Value Added Network (VAN), where the VAN is accessible at least by the first business and a second business;

posting the estimate request on the VAN;

accessing, by a plurality of businesses, the posted estimate request;

estimating, by a second business within the plurality of businesses, the conditions by which the second business is willing to fulfill the requirement corresponding to the posted and accessed estimate request;

submitting the estimated conditions to the VAN; and notifying the first business, via the VAN, that the second business has submitted the estimated conditions, wherein if, when an order for an article or service is sent to the second business, and an estimate reply has not been obtained from the second business, a request to estimate the requirement is made to the second business before the order is sent and the order is then sent after a reply to the estimate request has been received, wherein when replies to the estimate request are obtained from the second business and a third business, an order request is automatically made to the one of the second and third business that fulfills predetermined evaluation criteria, and wherein a new order request is refused when a previously ordered and delivered article or service is indicated as not having been inspected for acceptance.

18. The method recited in claim 17, wherein said soliciting, posting, accessing, estimating, submitting, and notifying are responsive to the first business generating an order request.

19. The method recited in claim 18, further comprising:

placing, on the VAN, the order request, pursuant to the conditions that were estimated, submitted, and notified, said placing responsive to the first business generating the order request.

20. The method recited in claim 19, further comprising:

making, within an office of the first business, an internal request which is one of an internal estimate request and an internal order request, the internal request corresponding to the requirement of the first business; and presenting the made internal request to a service center within the first business;

evaluating for approval the presented request, at the service center, responsive to said presenting, and before said soliciting; and wherein said soliciting further comprises soliciting in response said evaluating.

21. A method for procuring, over a network, from within an organization, a vendor's goods and services, comprising:

electronically requisitioning, within a first division of the organization, goods or services;

approving, within a second division of the organization, the requisition;

electronically generating and sending over the network to the vendor a purchase order corresponding to the approved requisition, wherein if, when the order for an article or service is sent, and an estimate reply has not been obtained from vendors, a request to estimate the requirement is made to the vendors before the order is sent and the order is then sent over the network after a reply to the estimate request has been received, wherein when replies to the estimate request are obtained from the vendors, an order request is automatically made to one of vendors that fulfills predetermined evaluation criteria, and wherein a new order request is refused when a previously ordered and delivered article or service is indicated as not having been inspected for acceptance;

delivering, from the one of the vendors to the first division, the ordered goods or services;

receiving and accepting, at the first division, the delivered goods or services;

notifying the second division that said receiving and accepting has occurred; and paying-out, at the second division, for the delivered goods or services.

22. A computer-readable storage medium for allowing a computer to perform the functions of:

entering data input by input means of a processing unit installed inside an organization;

transmitting an order request entered and data related to the order request input later as requested by a processing unit installed in a vendor company outside the organization, wherein if, when an order for an article or service is sent to the vendor, and an estimate reply has not been obtained from the vendor, a request to estimate the article or service is made to the vendor before the order is sent and the order is then sent after a reply to the estimate request has been received, wherein when replies to the estimate request are obtained from two or more vendors, an order request is automatically made to a vendor that fulfills predetermined evaluation criteria, and wherein a new order request is refused when a previously ordered and delivered article or service is indicated as not having been inspected for acceptance; and transmitting data used by the vendor to make a reply to the order request as requested by the processing unit in the vendor company and entering data input and transmitted by the processing unit in the vendor company.

23. An electronic transaction system for ordering an article or service required by an organization, comprising:

a processing unit inputting a request for an order;

a communication unit communicating the order request to a plurality of vendors;

an information management unit receiving information from the vendors related to the order request; and an order processing unit inputting an order in response to the received information, wherein if, when an order for an article or service is sent to the vendors, and an estimate reply has not been obtained from the vendors, a request to estimate the article or service is made to the vendors before the order is sent and the order is then sent after replies to the estimate request have been received, wherein when the replies to the estimate request are obtained from two or more vendors, an order request is automatically made to a vendor that fulfills predetermined evaluation criteria, and wherein a new order request is refused when a previously ordered and delivered article or service is indicated as not having been inspected for acceptance.

* * * * *

UNITED STATES PATENT AND TRADEMARK OFFICE

CERTIFICATE OF CORRECTION

PATENT NO. : 6,669,832 B1
DATED : December 30, 2003
INVENTOR(S) : Katsuro Saito et al.

It is certified that error appears in the above-identified patent and that said Letters Patent is hereby corrected as shown below:

Column 14,
Line 43, add -- 6, -- after the word "claim".

Signed and Sealed this

Sixth Day of April, 2004

JON W. DUDAS
*Acting Director of the United States Patent and Trademark Office*